United States Patent [19]

Burton

[11] 3,976,209
[45] Aug. 24, 1976

[54] PICK-UP TRUCK LOADING RAMP

[76] Inventor: Edward E. Burton, 19418 Lemarsh St., Northridge, Calif. 91324

[22] Filed: Aug. 9, 1974

[21] Appl. No.: 496,048

[52] U.S. Cl. .................................. 214/85; 52/226; 52/645; 296/61
[51] Int. Cl.² .......................................... B60P 1/00
[58] Field of Search .............. 214/85, 85.1; 296/61, 296/20; 14/71, 72; 52/641, 645, 646, 226

[56] References Cited
UNITED STATES PATENTS

| | | | |
|---|---|---|---|
| 1,115,775 | 11/1914 | Bisbach | 14/72 |
| 1,169,517 | 1/1916 | Silver | 14/71 |
| 1,232,437 | 7/1917 | Simpson | 14/72 |
| 1,271,631 | 7/1918 | Velo et al. | 14/71 |
| 1,415,554 | 5/1922 | Hatch | 52/645 |
| 2,781,525 | 2/1957 | Bauer | 296/20 X |
| 3,352,440 | 11/1967 | Wilson | 214/85 |
| 3,580,404 | 5/1971 | Mosey | 214/85 |
| 3,713,553 | 1/1973 | Curtis et al. | 214/85 |

Primary Examiner—Robert J. Spar
Assistant Examiner—Donald W. Underwood
Attorney, Agent, or Firm—Charles T. Silberberg

[57] ABSTRACT

A folding loading ramp for attachment to the end gate of pickup trucks. The ramp is of such a construction so that it may fold up with the tailgate, take up minimal additional space, and not interfere with the normal use of the end gate of the truck. The ramp includes a number of foldable ramp members which are hinged to make a convenient ramp for hard to load items, such as garden tractors, motorcycles, snowmobiles, etc. Added support is given to the ramp by a supporting mechanism which folds within the ramp members when not in use. The supporting mechanism reinforces the ramp by virtue of its structure rather than by contact with the ground. This allows folding of the support mechanism within the ramp members for space saving and provides support when the loading ramp is used with a loading dock. A combination handle and locking mechanism allows for positioning the ramp as a space extension for the vehicle bed and pulling the ramp to an extended position from the folded position.

8 Claims, 11 Drawing Figures

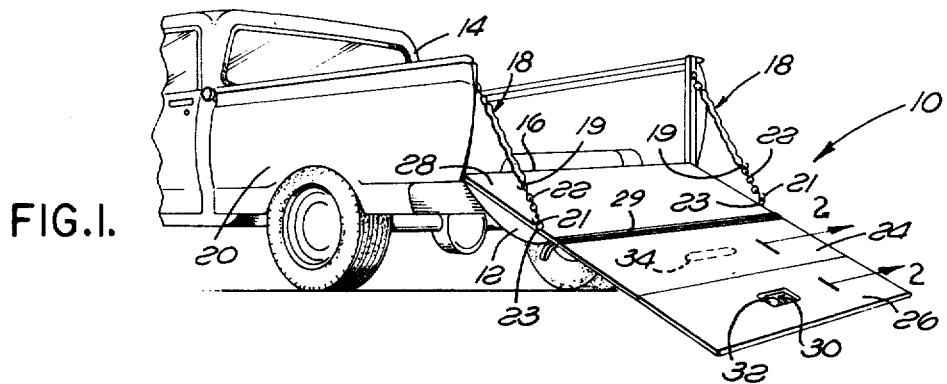
FIG.1.
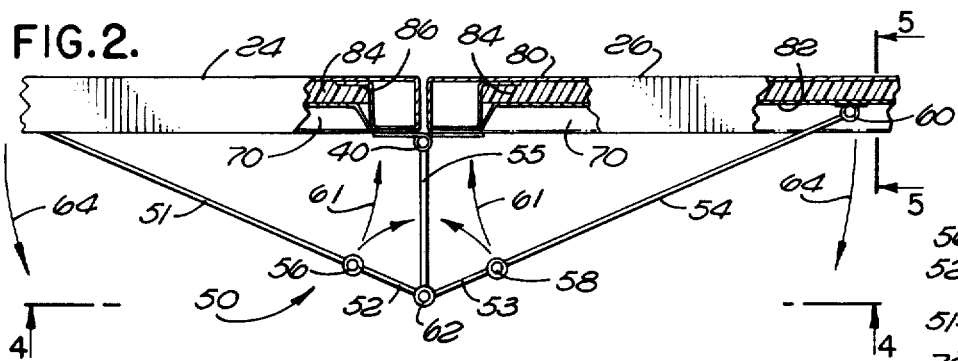
FIG.2. FIG.3.
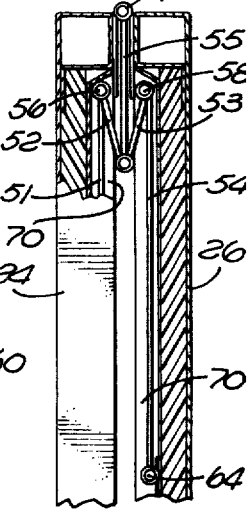
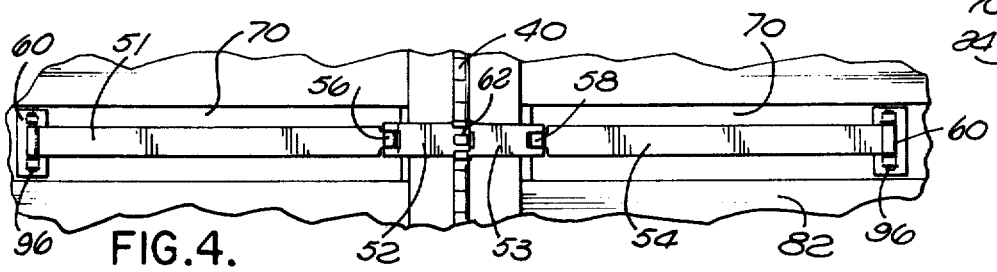
FIG.4.
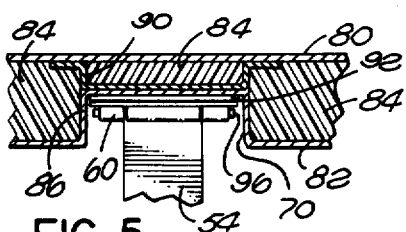
FIG.5.
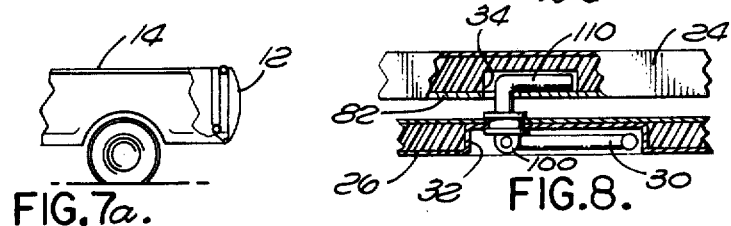
FIG.7a. FIG.8.
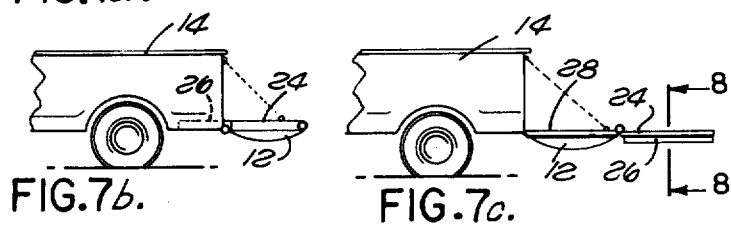
FIG.7b. FIG.7c.
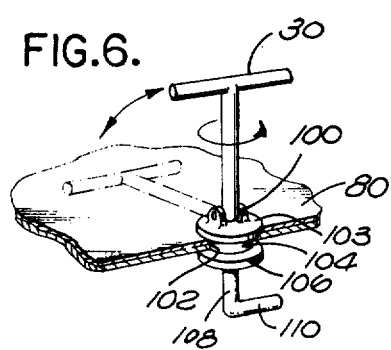
FIG.6.
FIG.7d.

PICK-UP TRUCK LOADING RAMP

BACKGROUND OF THE INVENTION

This invention relates to a device for loading cargo onto the bed of a truck and more particularly relates to a foldable ramp attached to the tail gate of a pickup truck.

The loading and unloading of bulky or heavy objects from a vehicle for purposes of delivery to the consumer or use at another location by the owner presents many problems. Frequently, the weight and size of the object is sufficiently great that at least two persons are required to lift it to the bed of the transferring vehicle and, on many occasions, normal loading is completely impossible. Even with sufficient manpower, constant threat of injury hinders operations. As a result, costs and schedule are detrimentally effected.

Different types of loading devices have been proposed to alleviate these problems. Such devices include lift trucks and hoists. However, these devices are extremely expensive to purchase and are not justified unless a high volume of heavy merchandise is being moved by a particular vehicle. Consequently, loading ramps adopted to form an inclined surface from the ground to the bed of the vehicle over which the goods may be moved have been proposed. U.S. Pat. Nos. 3,339,968 to Hall and 3,352,440 to Wilson disclose such ramps which are attached to the truck tail gate.

However, these ramps have also been unsuccessful in that they do not combine the previsions of being foldable with sufficient structural qualities to withstand heavy loads. By being foldable space was conserved, but at the expense of load bearing capabilities, especially at the hinge between the ramp members.

U.S. Pat. No. 2,727,781 realized this problem and provides a plurality of pivotable legs for support at the hinge. However, this approach only supports the hinge and not the two ramp members. Further, this device is impractical as a plurality of hinged legs is expensive and requires extra space for the legs when folded. This device requires the legs to touch the ground for support. If the ramp is elevated as when receiving items from a loading dock, blocks must be placed under the legs. This requires time in finding the blocks and placing them under the legs and is not at all safe.

SUMMARY OF THE INVENTION

It is, therefore, an object of the present invention to provide an efficient, practical, versatile, and inexpensive foldable ramp for the loading or unloading of bulky or heavy objects from a vehicle.

It is another object of the present invention to provide means for reinforcing the loading ramp when the ramp is extended into loading or unloading position which supports the hinge between the ramp members and the ramp members.

It is yet another object of the present invention to provide a means for reinforcing the loading ramp when the ramp is extended into loading or unloading position which is foldable and adds support by virtue of its structure and connection to the ramp members and hinge rather than by contact with the ground.

It is still another object of the present invention to provide a ramp which is safely and adequately reinforced when extended from the truck bed to the ground or from the truck bed to a dock.

An additional object of this invention is to provide a device of the type described which is capable of serving as a truck bed space extension in a simple manner as well as a loading and unloading ramp.

Further, another object is to provide a reinforced loading ramp where no extra space is required for the reinforcing means when the loading ramp is folded.

Briefly, in accordance with the invention, there is provided a pickup truck loading ramp having two foldable ramp members. A connecting means is provided for pivotally connecting one of the ramp members to the truck and gate. Another connecting means pivotally connects the ramp members to one another. A foldable supporting means is connected to the latter connecting means and the ramp members when the ramp members are extended to the loading or unloading position. The supporting means provides reinforcement by its structure and connections.

Other objects and advantages of the invention will become apparent upon reading the following detailed description and upon reference to the drawings.

BRIEF DESCRIPTION OF THE DRAWINGS

FIG. 1 is a perspective view of the loading ramp attached to the tail gate of a pickup truck and in the extended position from the truck bed to the ground;

FIG. 2 is a fragmentary sectional view of the loading ramp of FIG. 1 taken in the direction of arrows 2—2 of FIG. 1;

FIG. 3 is a sectional view of two ramp members in the folded position;

FIG. 4 is a fragmentary bottom plan view taken in the direction of arrows 4—4 of FIG. 2 of the loading ramp and illustrating the supporting mechanism;

FIG. 5 is a fragmentary sectional view of the connection of the supporting mechanism to the ramp members and internal structural details of the ramp members taken in the direction of arrows 5—5 of FIG. 2;

FIG. 6 is a detail perspective view of the handle-locking mechanism with the handle in the recessed position as shown by the broken line and in the extended position by the solid line;

FIGS. 7a, 7b, 7c, and 7d illustrate various positions of the loading ramp relative to the truck bed;

FIG. 8 is a fragmentary sectional view of the handle-locking mechanism employed in the locking position taken in the direction of arrows 8—8 of Figure 7c.

While the invention will be described in connection with the preferred embodiment, it will be understood that it is not intended to limit the invention to those embodiments. On the contrary, it is intended to cover all alternatives, modifications, and equivalents that may be included within the spirit and scope of the invention as defined by the appended claims.

DETAILED DESCRIPTION OF THE INVENTION

Turning first to FIG. 1, there is shown an example of carrying out the invention, wherein a loading ramp, generally indicated at 10, is connected to the end gate 12 of a pick up truck 14. The loading ramp 10 is illustrated in the extended position for loading or unloading articles from the truck bed 16 to the ground.

A pair of chain 18 attached to side panels 20 and end gate 12 normally restrain the pivotal movement of the end gate 12 to a position parallel to the bed 16. When this is the case, chain extensions 22 can be added to chains 18 by attaching each of the hooks 19 at the end of chains 18 to a link of chain extension 22, and the hook 21 at the end of each of the extensions 22 to a link 23 attached to end gate 12 so that end gate 12 will be oriented angularly downward at this extended position.

Loading ramp 10 typically includes upper and lower members 24 and 26 respectively. Upper ramp member 24 is pivotally attached to another ramp member 28 by a hinge 29. Ramp member 28 is secured to the inner surface of the end gate 12 by any suitable means such as bolts (not shown). Preferably, the length and width of ramp member 28 are approximately the same as end gate 12 so that ramp member 28 substantially covers the entire surface area of end gate 12 to allow handling of the widest possible loads. A handle 30 is provided within a recess 32 in lower ramp member 26 for ease in pulling the ramp 10 to an extended position from the folded or closed position. Handle 30 as will later be explained also functions as a locking member with a lateral slot 34 in ramp member 24 for utilizing the ramp 10 as a truck bed space extension.

Referring now to FIGS. 2 and 3, ramp members 24 and 26 are pivotally connected to each other by a hinge 40. The hinge 40 and members 24 and 26 are reinforced by one or more supporting mechanisms generally indicated at 50. Supporting mechanism 50 comprises four longitudinal struts 51, 52, 53, and 54 and a central strut 55. Struts 51 and 54 are pivotally joined at 56 while struts 53 and 54 are pivotally joined at 58. Struts 51 and 54 are pivotally connected to ramp members 24 and 26 respectively by hings 60. A joint 62 pivotally connects struts 52 and 53. The central strut 55 is fixedly connected to joint 62 and hinge 40. In the extended position as shown, support means 50 forms a truss. Forces applied to ramp members 24 and 26 anywhere along the length of the truss or to hinge 40 are supported by the truss. The applied forces are internally distributed to the struts of the truss and the ramp members 24 and 26 by the truss structure. The applied forces are thereby absorbed or supported by the truss with each of the elements in tension or compression depending on the direction, location, and amount of the applied forces.

The support means 50 can be folded in the direction shown by arrows 61 and 64 by application of a transverse force, i.e., perpendicular to the extended longitudinal struts, to the joints 56 and 58 or longitudinal struts and inward rotation of ramp members 24 and 26. A longitudinal groove 70 is provided in both ramp members 24 and 26 for each supporting member 50. Thus, as shown in FIG. 3, when ramp members 24 and 26 are in the folded position, the support mechanism is folded within ramp members 24 and 26 with the bulk of the support means 50 within grooves 70 so that little or no additional space is taken up by the ramp 10 due to the support means 50 when the ramp is the folded position.

As can best be seen in FIGS. 2 and 5, ramp members 24 and 26 have a top skin 80 and a bottom skin 82 which can be of any suitable material such as steel or aluminum affixed together as by welding. The loading surface of members 24, 26, and 28 is optimally covered by an anti-skid material such as a Deck-Tread paint to prevent load slippage. Members 24 and 26 are hollow between the top skin 80 and bottom skin 82 to minimize weight and cost. A foam material 84 such as styrofoam is preferably fitted within the hollow portions to increase compressive strength of the ramp while not significantly increasing weight or cost of the ramp 10. The top skin 80 also forms the ends of members 24 and 26. The top skin 80 continues on the bottom of the ramp members 24 and 26 for a distance corresponding to the length of hinge 40, then upward to the top of ramps 24 and 26 where it is flanged at 86 and affixed.

The grooves 70 are formed by a longitudinal hat section 86 which also constitutes the bottom skin 82. The indented portion 70 of the hat section 86 constitutes the groove 70. Hat section 86 is suitably affixed to another longitudinal hat section 90 which is secured to top skin 80. Hinge 60 is mounted over a spacer 92 to allow for a cylindrical pin 96 in the hinge 60. Hinge 60 is suitably secured to hat section 86 as by spot welding. Ramp member 28 is preferably completely hollow and optimally is filled with a foam.

FIGS. 6 and 8 illustrate the handle-locking mechanism of the present invention. The handle 30 is a standard T-handle which is pivotally connected by a hinge 100 to the top skin 80 within recess 32 of ramp member 26. Hinge 100 is rotatively mounted within an aperture 102 in recess 32 which extends through member 26 by being connected to a flanged end 103 of a bar 104 in aperture 102, the bar 102 also having another flanged end 106. The flanged ends 103 and 106 are positioned on both sides of aperture 102. Fixedly attached to flanged end 106 is rod 108 with a detent 110.

Handle 30 can be withdrawn from recess 32 when it is desired to pull the ramp 10 to an extended position. For locking ramp members 24 and 26 together, detent 110 is placed longitudinally within longitudinal slot 34 and rotated by handle 30 so that the detent 110 prevents separation of ramp members 24 and 26 by catching on the underside of bottom skin 82 of member 24. For unlocking, the handle 30 is rotated until detent 110 is aligned with longitudinal slot 34 and it can thereby be removed. As handle 30 is within a recess 32 and uses a slot 34 in member 24 for locking, no additional storage space is required when the ramp 10 is in the folded position.

OPERATION

The versatility and operation of the present invention are illustrated in FIGS. 1, 7a, 7b, 7c, and 7d. FIG. 7a shows the ramp 10 in the closed or folded position. The only extra storage space used is the thickness of members 24, 26, and 28. The ramp 10 can be extended from the folded position to the ground by lowering tail gate 12, unlocking ramp members 24 and 26 using handle 30, and rotating the ramp members 24 and 26 outward using handle 30. This procedure is reversed for moving the ramp 10 to the closed position. FIG. 7b shows the position of ramp 10 when the end gate 12 is down for the purpose of space extension of bed 16. In this position ramp member 26 is folded inward after tail gate 12 has been lowered. FIG. 7c shows the use of the ramp as a space extension for bed 16 beyond the end gate 12. For this position, the ramp member 26 is rotated outward after the end gate 12 is lowered with the members 24 and 26 retained in a locked position by detent 110. FIG. 7d shows the ramp 10 used with a loading dock 120. Ramp 10 is simply fully extended and then lifted to rest on loading block 122 of loading dock 120. In this position the ramp members 24 and 26 and hinge 40 are still reinforced by the supporting means 50.

Thus, it is apparent that there has been provided, in accordance with the invention, a truck loading ramp that fully satisfies the objects, aims, and advantages set forth above. While the invention has been described in conjunction with specific embodiments thereof, it is evident that many alternatives, modifications, and variations will be apparent to those skilled in the art. Accordingly, it is intended to embrace all such alternatives, modifications, and variations as fall within the spirit and scope of the appended claims.

What is claimed is:

1. A loading ramp for trucks having an end-gate, said ramp comprising:

two foldable ramp members;

first means pivotally connecting one of said ramp members to said end-gate;

hinge means pivotally connecting said ramp members to one another;

foldable supporting means connected to said hinge means and pivotally connected to said foldable ramps for reinforcing said hinge means and said ramp members when said ramp members are extended solely by its structure and connection to said hinge means and said ramps, said supporting means being adapted to support loads on said hinge means by distributing the loads internally in said supporting means and ramp members; and wherein said ramp members have longitudinal grooves enclosing the bulk of said supporting means when said ramp members and said supporting means are folded whereby the space occupied by the folded loading ramp is minimized.

2. Apparatus as set out in claim 1 wherein said supporting means is at least one truss, said truss having at least three members, one of said members being connected to said hinge means and two of said members being connected to said ramp members.

3. Apparatus as set out in claim 2 also including a locking means for locking said ramp members in a folded position, said locking means comprising a rotatable detent.

4. Apparatus as set out in claim 3 wherein said locking means further comprises a slot in one of said ramp members and a rotatable handle mounted to said other ramp member, said detent being connected for rotation with said handle whereby said ramp members are locked together in a folded position when said detent is within said slot and out of alignment with said slot.

5. Apparatus as set out in claim 2 wherein said truss comprises four longitudinal members, a central member, a pair of said longitudinal members located on both sides of said central member, and a joint between each pair of longitudinal members to provide for folding of said longitudinal members.

6. Apparatus as set out in claim 5 wherein said first means includes a ramp member fixedly secured in overlapping relationship to the interior surface of said end gate.

7. Apparatus as set out in claim 5 wherein said ramp members have a hollow portion.

8. Apparatus as set out in claim 7 wherein said hollow portion is filled with a foam material.

* * * * *